United States Patent
Zeng et al.

(10) Patent No.: US 12,335,391 B2
(45) Date of Patent: Jun. 17, 2025

(54) OBTAINING METHOD AND APPARATUS FOR BLOCK GROUP HEADER, STORAGE MEDIUM, AND ELECTRONIC DEVICE

(71) Applicant: ZTE CORPORATION, Shenzhen (CN)

(72) Inventors: Ming Zeng, Shenzhen (CN); Haisheng Guo, Shenzhen (CN); Dezheng Wang, Shenzhen (CN); Yasen Liu, Shenzhen (CN); Hui Li, Shenzhen (CN); Han Wang, Shenzhen (CN); Yongjie Bai, Shenzhen (CN); Zixian Wang, Shenzhen (CN); Qi Lv, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 222 days.

(21) Appl. No.: 18/257,667

(22) PCT Filed: Nov. 4, 2021

(86) PCT No.: PCT/CN2021/128716
§ 371 (c)(1),
(2) Date: Jun. 15, 2023

(87) PCT Pub. No.: WO2022/127424
PCT Pub. Date: Jun. 23, 2022

(65) Prior Publication Data
US 2024/0031151 A1    Jan. 25, 2024

(30) Foreign Application Priority Data
Dec. 16, 2020    (CN) .......................... 202011488871.4

(51) Int. Cl.
*G06F 16/00*    (2019.01)
*G06F 16/27*    (2019.01)
(Continued)

(52) U.S. Cl.
CPC ................ *H04L 9/32* (2013.01); *G06F 16/27* (2019.01); *H04L 9/50* (2022.05)

(58) Field of Classification Search
CPC ......... H04L 9/32; H04L 9/50; H04L 67/1093; H04L 2209/463; G06F 16/27
See application file for complete search history.

(56) References Cited

U.S. PATENT DOCUMENTS

2020/0059369 A1* 2/2020 Li ......................... H04L 9/0643
2020/0092085 A1   3/2020 Baek et al.

FOREIGN PATENT DOCUMENTS

CN    109964446 A    7/2019
CN    110868434 A    3/2020
(Continued)

OTHER PUBLICATIONS

Yu et al., "Virtual Block Group: A Scalable Blockchain Model with Partial Node Storage and Distributed Hash Table", The British Computer Society 2020,pp. 1524-1536 (Year: 2020).*

(Continued)

*Primary Examiner* — Alexander Khong
(74) *Attorney, Agent, or Firm* — Vivacqua Crane, PLLC

(57) ABSTRACT

An obtaining method and apparatus for a block group header, a storage medium, and an electronic device are disclosed. The method may include, performing a determination as to whether a target node in a blockchain system meets a preset condition, where the preset condition is indicative of at least one of, the target node receiving a block group header but failing to receive a preset number of legal blocks, or the target node failing to receive the block group header; identifying a cause of an event that the target node fails to receive the block group header, in response to the determination that the target node fails to receive the block group header, where the cause of the event comprises at least one of, the target node failing to receive the block group (Continued)

header, or the blockchain system failing to generate the block group header; and determining a method for acquiring by the target node, the block group header that fails to be received, according to the cause of the event.

20 Claims, 7 Drawing Sheets

(51) Int. Cl.
*H04L 9/00* (2022.01)
*H04L 9/32* (2006.01)

(56) References Cited

FOREIGN PATENT DOCUMENTS

| | | |
|---|---|---|
| CN | 111368008 A | 7/2020 |
| CN | 111382456 A | 7/2020 |
| CN | 112104482 A | 12/2020 |
| WO | 2020138532 A1 | 7/2020 |

OTHER PUBLICATIONS

International Searching Authority. International Search Report and Written Opinion for PCT Application No. PCT/CN2021/128716 and English translation, mailed Jan. 29, 2022, pp. 1-15.
Min, et al. "Permissioned Blockchain Dynamic Consensus Mechanism Based Multi-Centers," Chinese Journal of Computers), May 2018, and English translation, pp. 1-17.

* cited by examiner

Perform a determination as to whether a target node in a blockchain system meets a preset condition, where the preset condition is indicative of at least one of, the target node receiving a block group header but failing to receive a preset number of legal blocks, or the target node failing to receive the block group header ⸺ S402

Identify a cause of an event that the target node fails to receive the block group header, in response to the determination that the target node fails to receive the block group header, where the cause of the event includes at least one of, the target node failing to receive the block group header, or the blockchain system failing to generate the block group header ⸺ S404

Determining a method for acquiring by the target node, the block group header that fails to be received, according to the cause of the event ⸺ S406

FIG. 4

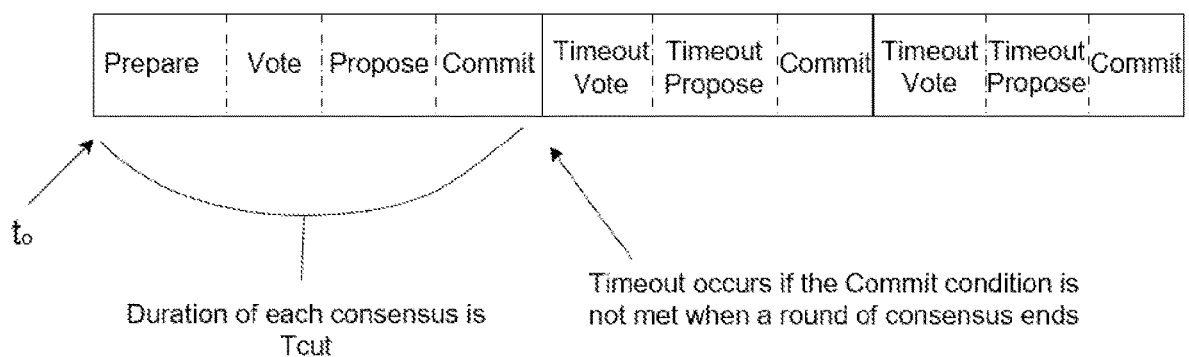

FIG. 5 ical scheme of the present disclosure, and they are intended to
OBTAINING METHOD AND APPARATUS FOR BLOCK GROUP HEADER, STORAGE MEDIUM, AND ELECTRONIC DEVICE

CROSS-REFERENCE TO RELATED APPLICATION

This application is a national stage filing under 35 U.S.C. § 371 of international application number PCT/CN2021/128716, filed Nov. 4, 2021, which claims priority to Chinese patent application No. 202011488871.4 filed Dec. 16, 2020. The contents of these applications are incorporated herein by reference in their entirety.

TECHNICAL FIELD

The present disclosure relates to the field of communication, in particular to a method and a device for acquiring a block group header, a storage medium, and an electronic apparatus.

BACKGROUND

The blockchain system is a distributed system with traceable history in which tampering is not possible, and solves the problem of mutual trust. However, the distributed system is bound to face the consistency problem, that is, to reach a consensus which relies on reliable consensus algorithms. Common consensus algorithms include the Proof of Work consensus algorithm, practical Byzantine fault-tolerant algorithm, Parallel Proof of Vote algorithm and so on.

In the Parallel Proof of Vote (PPoV) consensus algorithm, the blockchain nodes are classified into bookkeeping nodes, voting nodes and leader nodes. Each bookkeeping node generates blocks and publishes them in the network. Voting nodes collect the blocks generated by bookkeeping nodes and vote, and then summarize the voting information and send it to the leader node. The leader node collects the summarized voting information for statistics, writes the statistical results into the block group header, and finally publishes the block group header to the network.

However, during the generation of block group headers in the PPoV consensus algorithm, if a few bookkeeping nodes fail, it is not possible for the voting nodes to vote since they can't collect enough blocks. Therefore, the leader nodes fail to collect the voting information from the voting nodes for generating the block group headers.

Very limited effective solutions have been proposed at present for the low acquisition rate in the acquisition of block group headers in the PPoV consensus algorithm in some technical schemes.

SUMMARY

Provided are a method and a device for acquiring a block group header, a storage medium, and an electronic apparatus in some embodiments of the present disclosure, so as to alleviate one of the related technical problems, including the problem of the low acquisition rate of PPoV consensus algorithm during the acquisition of the block group header.

An embodiment of the present disclosure provides a method for acquiring a block group header, which may include, performing a determination as to whether a target node in a blockchain system meets a preset condition, where the preset condition is indicative of at least one of, the target node receives a block group header but fails to receive a preset number of legal blocks, or the target node fails to receive the block group header; identifying a cause of an event that the target node fails to receive the block group header, in response to the determination that the target node fails to receive the block group header, where the cause of the event includes at least one of, the target node failing to receive the block group header, or the blockchain system failing to generate the block group header; and determining a method for acquiring by the target node, the block group header that fails to be received, according to the cause of the event.

An embodiment of the present disclosure provides a device for acquiring a block group header, which may include, a first determining module, which is configured to perform a determination as to whether a target node in a blockchain system meets a preset condition, where the preset condition is indicative of at least one of, the target node receiving a block group header but failing to receive a preset number of legal blocks, or the target node failing to receive the block group header; a second determining module, which is configured to identify a cause of an event that the target node fails to receive the block group header, in response to the determination that the target node fails to receive the block group header, where the cause of the event includes at least one of, the target node failing to receive the block group header, or the blockchain system failing to generate the block group header; and a third determining module, which is configured to determine a method for acquiring by the target node, the block group header that fails to be received, according to the cause of the event.

An embodiment of the present disclosure further provides a computer-readable storage medium storing a computer program, which when executed by a processor, causes the processor to carry out the method described above.

An embodiment of the present disclosure further provides an electronic apparatus, which may include a memory, a processor, and a computer program stored in the memory and executable on the processor which, when executed by the processor, causes the processor to carry out the method as described above.

BRIEF DESCRIPTION OF DRAWINGS

The drawings are intended to provide a further understanding of the technical scheme of the present disclosure, and form a part of the description, and they are intended to illustrate the technical scheme of the present disclosure in conjunction with the embodiments of the present disclosure, but are not intended to improperly limit the technical scheme of the present disclosure. In the drawings:

FIG. 4 depicts a flowchart showing a method for acquiring a block group header according to an embodiment of the present disclosure;

FIG. 5 depicts a schematic diagram showing the timeout trigger condition for a blockchain node according to an embodiment of the present disclosure;

DETAILED DESCRIPTION

Embodiments of the present disclosure will be described below in conjunction with the drawings in order to facilitate the understanding of the solution of the present disclosure by those having ordinary skills in the art. It is apparent that, the described embodiments are some but not all of the embodiments of present disclosure. Based on the embodiments described herein, all other embodiments that can be achieved by those having ordinary skill in the art without creative effort shall fall within the scope of protection of the present disclosure.

It should be noted that the terms "first" and "second", if used in the description, claims, and the drawings are intended to distinguish similar objects, and do not necessarily imply any specific order or sequence. It should be understood that the data used in this way can be interchanged under appropriate circumstances, so that the embodiments described here can be implemented in an order other than those illustrated or described here. In addition, the terms "including" or "having" and any variations thereof are non-exclusive. For example, a process, method, system, product or device that includes a series of steps or units is not necessarily limited to those steps or units that are clearly stated, but may include other steps or units that are not clearly stated or inherent to these processes, methods, products or devices.

Figure 1:
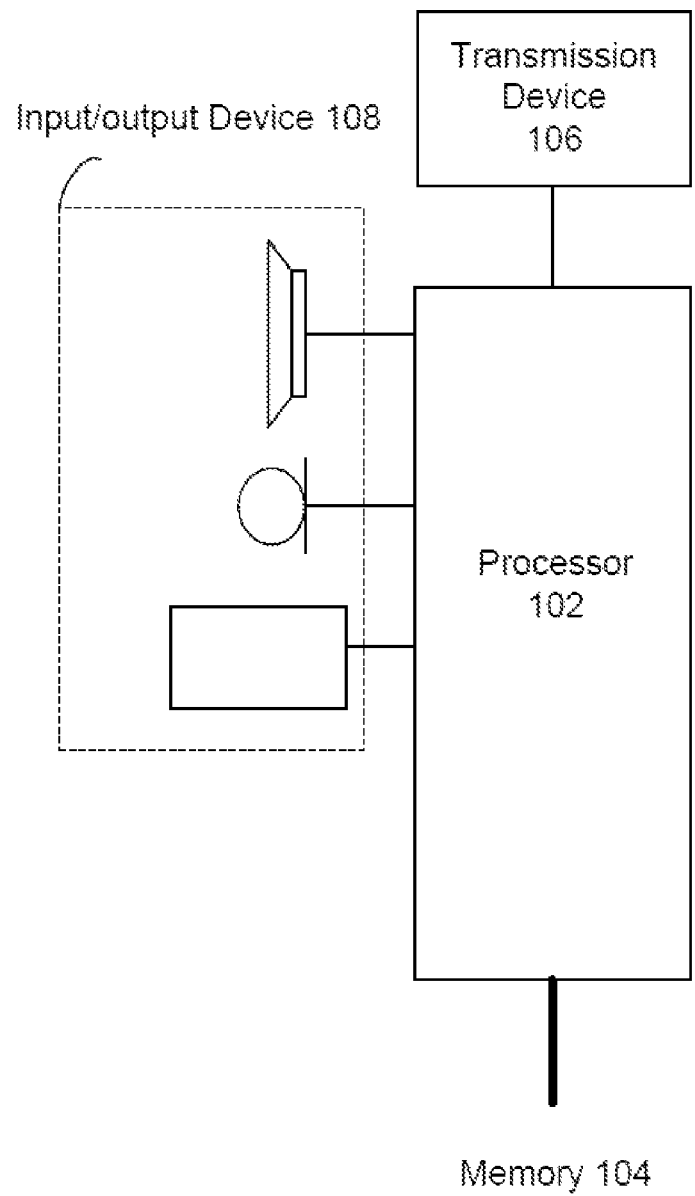
FIG. 1 depicts a block diagram showing the hardware structure of a computer terminal device for the method for acquiring a block group header according to an embodiment of the present disclosure.

The method embodiment set forth in an embodiment of the present disclosure may be implemented in a computer terminal device or a similar computing device. FIG. 1 depicts a block diagram showing the hardware structure of a computer terminal device for the method for acquiring a block group header according to an embodiment of the present disclosure, by way of an example in which the method is implemented in the computer terminal device. As shown in FIG. 1, the computer terminal device may include one or more (only one is shown in FIG. 1) processors 102 (the processors 102 may include but are not limited to processing devices such as a microprocessor MCU or a programmable logic device like FPGA) and a memory 104 for storing data. In an embodiment, the computer terminal device may also include a transmission device 106 for communication, and an input/output device 108. It can be understood by those skilled in the art that the structure shown in FIG. 1 is only schematic, and the above-mentioned computer terminal device is not limited thereto. For example, the computer terminal device may also include more or fewer components than those shown in FIG. 1, or have a different configuration with equivalent functions to those shown in FIG. 1 or more functions than those shown in FIG. 1.

Memory 104 can be configured to store computer programs, for example, software programs and modules of application software, such as the computer programs corresponding to the method for acquiring the block group header in an embodiment of the present disclosure. Processor 102 executes various functional applications and data processing by running the computer programs stored in memory 104, such that, the above-described method is carried out. The memory 104 may include high-speed random-access memory, and may also include non-volatile memory, such as one or more magnetic storage devices, flash memory, or other non-volatile solid-state memory. In some implementations, memory 104 may further include memory remotely arranged with respect to processor 102, and the remote memory may be connected to the computer terminal device through a network. Examples of the above networks include, but are not limited to, the Internet, intranet, local area network, mobile communication network, and combinations thereof.

The transmission device 106 is configured to receive or transmit data via a network. Specific examples of the above-mentioned networks may include wireless networks provided by communication providers of computer terminal devices. In one example, the transmission device 106 includes a Network Interface Controller (NIC), which may be connected with other network devices through a base station so as to communicate with the Internet. In an implementation, the transmission device 106 is a Radio Frequency (RF) module, which is configured to wirelessly communicate with the Internet.

In the traditional Proof of Vote (PoV) consensus algorithm, there is designed a specific role model, which classifies the nodes in the blockchain network into four roles: Commissioner, Butler, Butler Candidate, and Ordinary User. The butler candidate can be transformed from an ordinary user after the user applies to join. The butler candidates are voted by commissioners. In the voting stage, each commissioner needs to vote for each butler candidate, and the $N_b$ nodes with more votes than others will be elected as butler nodes. The butler nodes are mainly responsible for transactions collection and blocks generation.

Figure 2:
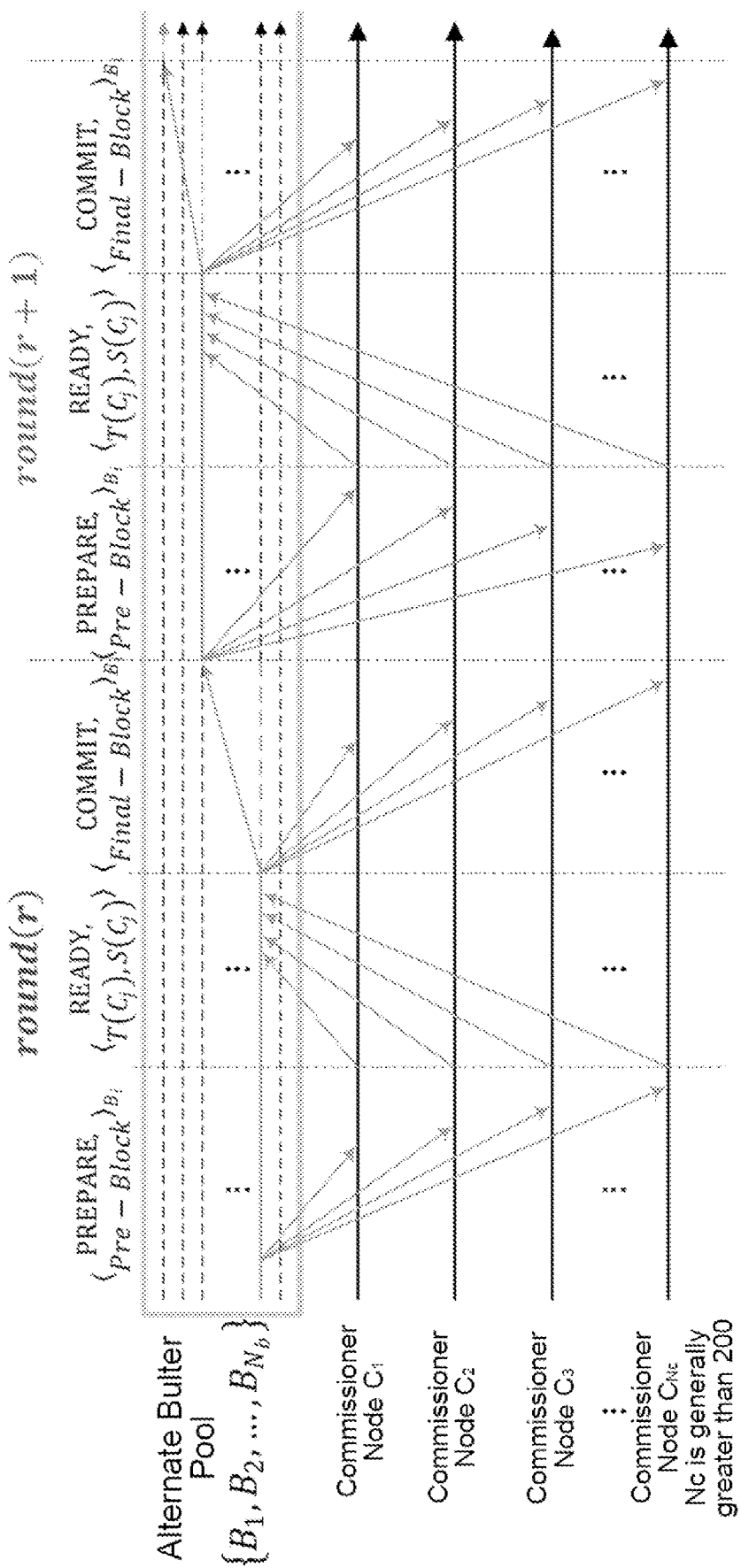
FIG. 2 depicts a schematic diagram showing message transmission in a procedure of PoV consensus according to an embodiment of the present disclosure.

In the PoV consensus algorithm, the consensus process of block generation is jointly carried out by a butler which is called a duty butler, and all commissioners. A duty butler is identified by the number of the duty butler. Suppose there are $N_c$ committee members, i.e., C1, C2, ..., $CN_c$ and there are $N_b$ butlers, i.e., B1, B2, ..., $BN_b$, as shown in FIG. 2, which depicts a schematic diagram showing message transmission in a procedure of PoV consensus according to an embodiment of the present disclosure. In FIG. 2, "round(r)" denotes the $r^{th}$ round, "round(r+1)" denotes the $(r+1)^{th}$ round, "PREPARE" denotes the preparation stage, "READY" denotes the ready stage, "COMMIT" denotes the commit stage, "Pre-Block" denotes the pre-block, and "Final-Block" denotes the final block. PoV consensus algorithm divides a round of consensus into four stages: Prepare, Ready, Commit, and Confirm, in which the Confirm stage is the block submission stage where no message transmission is required. Each block contains a block header and an indefinite number of transactions. In the Prepare stage, the duty butler takes out a particular number of transactions from the transaction pool and packages them to generate pre-blocks and sends them to all commissioners. The difference between a pre-block and a confirmed block is that the pre-block contains no time stamp, commissioners' signatures and the number of the subsequent duty butler. Each commissioner node needs to verify the information contained in the received pre-block header and transaction, and sign the pre-block header if the verification passes, and send the signature to the duty butler. After collecting more than $N_c/2$ signatures from the commissioners, the duty butler can complete the pre-block and release the confirmed block. The node receiving the newly released block stores the block in the local blockchain, and updates related variables including the number of the duty butler, thus updating the duty butler who is in charge of the subsequent round of consensus.

Like most consensus algorithms, PoV consensus algorithm selects one node from a plurality of candidate nodes as a bookkeeping node in each consensus period to generate blocks, so the process of block generation is serial, which is not efficient to support high throughput performance in large-scale cluster environment.

Figure 3:
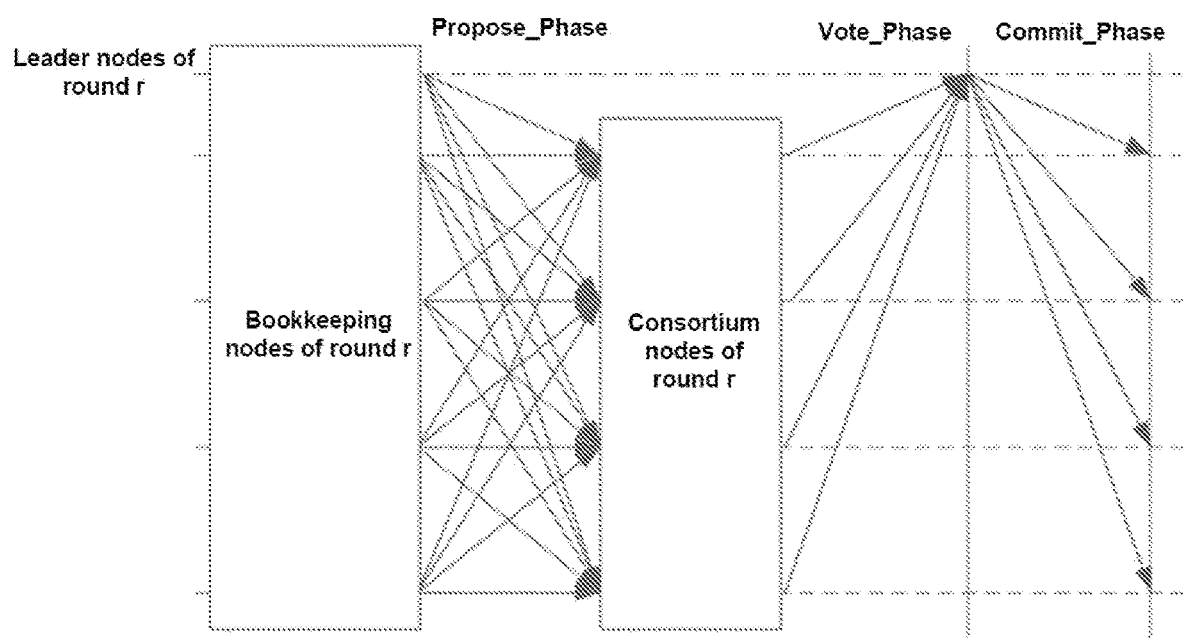
FIG. 3 depicts a schematic diagram showing a procedure of PPoV consensus according to an embodiment of the present disclosure.

In order to improve the performance of PoV, the PPoV consensus algorithm puts forward the concept of block group based on the idea of parallelism. A block group includes a block group header and a block group body. Each block group header contains the height of the current block group and the voting result, while the block group body contains a set of blocks that are voted consent. In particular, each block contains information like, the hash value of the previous block group, Merkel root, generator's public key, timestamp and transaction sets. In order to facilitate understanding, PPoV consensus generally expresses the identity of blockchain nodes as voting nodes, bookkeeping nodes and leader nodes respectively. FIG. 3 depicts a schematic diagram showing a PPoV consensus process according to an embodiment of the present disclosure, and each round of PPoV consensus includes following operations.

At S1, each bookkeeping node generates and publishes a block to the network. Each node in the blockchain collects each block generated by each bookkeeping node.

At S2, after the collection by the voting nodes of the blocks generated by the bookkeeping nodes at S1 is completed, the voting nodes votes for each block separately and generate a total voting message and send the message to the leader node. The voting message contains the hash value of each block, as well as the opinion of consensus or objection, and signature.

At S3, the leader node collects the voting messages sent by the voting nodes, conducts voting statistics and generates a voting result. When the number of consent or objection opinions of each block exceeds half of the number of voting nodes, the statistical results and all voting messages are stored in the block group header. Then the leader node generates a random number, which is the number of the leader node in the subsequent consensus cycle, and writes the number into the block group header. Then the leader node publishes the block group header to the network.

At S4, When the blockchain node receives all the blocks generated by the bookkeeping nodes and the block group header generated by the leader node, it stores them in the database as a block group.

However, the design of PPoV consensus algorithm is not perfect at present. Considering that the server may fail to operate properly due to various reasons in the real environment, in the case of multi-node parallel bookkeeping, the traditional PPoV consensus algorithm may fail to verify and generate the blocks generated by other normal nodes because of failures in a small number of bookkeeping nodes. That is, the traditional PPoV consensus algorithm will fail to generate block group headers for some reason and cannot meet the terminability.

In order to solve the above technical problems, in this embodiment, there is provided a method for acquiring a block group header. FIG. 4 depicts a flowchart showing a method for acquiring a block group header according to an embodiment of the present disclosure, the method includes the following operations.

At S402, a determination is performed as to whether a target node in a blockchain system meets a preset condition, where the preset condition is indicative of at least one of, the target node receiving a block group header but failing to receive a preset number of legal blocks, or the target node fails to receive the block group header.

At S404, a cause of the event that the target node fails to receive the block group header is identified, in response to the determination that the target node has not received the block group header, where the cause of the event includes at least one of, the target node fails to successfully receive the block group header, or the blockchain system fails to generate the block group header.

At S406, a method for acquiring by the target node, the block group header that fails to be received, is determined according to the cause of the event.

Through the above operations, it is determined whether the target node of the blockchain system meets the preset conditions. There are two preset conditions, one is that the target node receives the block group header but fails to receive a preset number of legal blocks, and the other one is that the target node fails to receive the block group header. According to these two situations, two different strategies are provided respectively. In the case of a failure in receiving the block group header, the cause of the event of the failure in receiving the block group header is identified, and then the method for acquiring the block group header that the target node fails to receive is determined according to the cause of the event. By means of the technical scheme described above, the problems of low acquisition rate of PPoV consensus algorithm during the acquisition of block group headers are solved, and then different methods are adopted according to different causes of the event for acquiring block group headers, thus improving the acquisition rate of block group headers.

It can be understood that, the condition for terminating the PPoV consensus algorithm lies in: condition 1, the target node receives the block group header but fails to receive the preset number of legal blocks; and condition 2, the target node fails to receive the block group header. The target node in the blockchain system should determine whether the preset conditions are met. If the preset conditions are not met, a timeout will be triggered, such that the target node will perform related operation for the timeout. When the target node fails to receive the block group header, the cause of the event is determined. In particular, the cause of the event includes at least one of, the target node failing to successfully receive the block group header, or the blockchain system failing to generate the block group header. Then the blockchain system determines the method for acquiring the block group header that the target node fails to receive according to the cause of the event. For example, bookkeeping node A in the blockchain system fails to receive a block group header, so bookkeeping node A triggers a timeout, requests its blockchain height from all voting nodes, and maintains the online status of each voting node locally. If the blockchain height of a voting node is higher than the local blockchain height of bookkeeping node A, it indicates that the bookkeeping node A fails to successfully receive the block group header. If the higher blockchain height is not found, it indicates that the blockchain system does not generate the block group header. Then the bookkeeping node A determines the method for acquiring according to the cause of the event.

At the same time, the above S406 can have various implementations. In an implementation, determining the method for acquiring the block group header that the target node fails to receive according to the cause of the event includes, synchronizing with a voting node of the blockchain system, and acquiring the block group header that the target node fails to successfully receive from the voting node, under the condition that the cause of the event indicates that the target node fails to successfully receive the block group header. In this implementation, if the target node does not receive the block group header, the target node requests a voting node for the block group header. As a core consensus node of the blockchain network, the voting node is considered to have the latest blockchain state. Once the system generates a block group header, the voting node will definitely receive the header during the broadcasting of the header to the blockchain network. For example, if the bookkeeping node A does not receive the block group header, the bookkeeping node A carries out a synchronization with the voting node B for data synchronization and acquires the block group header, where the blockchain height of the voting node B is higher than that of the bookkeeping node A.

In some examples, during the synchronization and acquisition of the unsuccessfully received block group header from the voting node of the blockchain system, it is necessary to acquire the block group header from the voting node with a higher blockchain height than the local height of the bookkeeping node. The blockchain height is indicative of the block height. In this embodiment, the blockchain height can be understood as a database. Since the blockchain system is a distributed system without a unified database, it can be understood that each blockchain node has a database. The blockchain height of the voting node is higher than the local height of the bookkeeping node, which indicates that the database of the voting node is newer than that of the bookkeeping node. Therefore, in order to obtain the block group header, it is necessary for an older database to synchronize data with a newer database.

S406 has another implementation. In an implementation, determining the method for acquiring the block group header that the target node fails to receive according to the cause of the event includes, instructing the voting nodes to vote for the block that has been received when the cause of the event indicates that the block group header has not been generated by the blockchain system, and setting the processing result of the unreceived legal block as the target value, so as to instruct the voting nodes to have no opinion on the unreceived legal block and generate the voting result, and sending the voting result to the duty bookkeeping node to instruct the duty bookkeeping node to generate the unreceived legal block group header. In this implementation, it can be understood that when the bookkeeping node requests its blockchain height from all the voting nodes, once no voting node is found to have a higher blockchain height than the local blockchain height of the bookkeeping node, it indicates that the blockchain system has not generated a block group header. In such a case, all the voting nodes are instructed to vote on the blocks received from the bookkeeping node. The processing result of the unreceived legal blocks is set as the target value, so as to indicate that the voting nodes have no opinion on the unreceived block. Then each voting node sends the respective voting result to the duty bookkeeping node for statistics. As such the duty bookkeeping node generates a block group header. For example, there exists bookkeeping node A, bookkeeping node B, bookkeeping node C, voting node X, voting node Y, voting node Z and duty bookkeeping node M. When bookkeeping node A fails to acquire with synchronization, the required block group header from voting node X, voting node Y and voting node Z, voting node X, voting node Y and voting node Z will routinely vote on the blocks that have been received from bookkeeping node A. Assuming that block A from bookkeeping node a and block b from bookkeeping node B have been received, voting node X, voting node Y and voting node Z will routinely vote on blocks a and b, and at the same time, the voting result for the unreceived block c that is supposed to be generated by bookkeeping node C shall be set to 0 (no opinion). Finally, the voting node X, the voting node Y and the voting node Z respectively generate a voting information table to the duty bookkeeping node M. The duty bookkeeping node M collects the tables and carries out statistics, thus generating the block group header.

During the generation of the unreceived legal block group header by the duty bookkeeping node, the duty bookkeeping node can only count the vote of each block in the block group and generate a statistical result when receiving the voting information from more than $2N_v/3$ of the voting nodes. If it is counted that more than $1N_v/3$ voting nodes agree with any one legal block, the duty bookkeeping node agrees to generate the legal block and sets its voting result to 1, otherwise, the duty bookkeeping node does not agree to generate the legal block and sets its voting result as −1. $N_v$ is the number of voting nodes in the blockchain system. For example, there exists voting node X, voting node Y, voting node Z, and voting node W. The duty bookkeeping node M can generate statistical results only when receiving the voting information of at least three of the four voting nodes, and any block is allowed to be generated only if at least two of the four voting nodes vote to consent.

After generating a legal block group header, the duty bookkeeping node broadcasts the generated block group header to each node of the blockchain system, so as to instruct all the nodes to verify the generated block group header. During the verification, only the block group header that includes more than $2N_v/3$ of the votes can pass the verification, and if the verification passes, the successfully generated block group header is received.

It can be understood that, if the target node successfully receives the target group header, but fails to receive a preset number of legal blocks, the target node sends an acquisition request to other nodes in the blockchain system, to acquire the legal blocks from the other nodes which are nodes other than the target node in the blockchain system and store the legal blocks. For example, bookkeeping node A successfully receives the block group header after the PPoV consensus ended, but fails to receive enough blocks due to network failure, such as block b and block c. In such a case, bookkeeping node A broadcasts a request to other nodes in the blockchain network for acquiring the blocks b and c that were not received.

It is apparent that, the embodiments described above are merely some, but not all of the embodiments of the present disclosure. In order to better understand the method for acquiring a block group header as described above, some embodiments of the above-described process are illustrated below, but they are not intended to limit the technical scheme of the present disclosure.

In the PPoV consensus algorithm, a round of consensus refers to all the operations needed to generate a block group. In the case of multi-node parallel bookkeeping, the blocks generated by other normal nodes may not be verified and generated due to failures in a small number of bookkeeping nodes. Through analysis, there are only three kinds of nodes that may directly affect the consensus process, the bookkeeping nodes, the duty bookkeeping nodes, and the voting nodes. Suppose that the starting time of a round of consensus is to, epoch is a round of consensus, and the duration of each round of consensus is $T_{cut}$, $N_{epoch}$ is the number of rounds of consensus that have been gone through from the moment $t_0$ to the current moment t, and $$N_{epoch}=(t-t_0)\%T_{cut}.$$

FIG. 5 depicts a schematic showing timeout trigger condition of a blockchain node according to an embodiment of the present disclosure. If in a round of consensus, the target node blockchain system in the blockchain system still can't meet the commit condition when the time $T_{cut}$ in a consensus round epoch runs out, that is, the target node can't generate an eligible block group, that is, both the block group header of the block group in this round of consensus and all the legal blocks that have been voted to be legal are not received, then a timeout is triggered.

Figure 6:
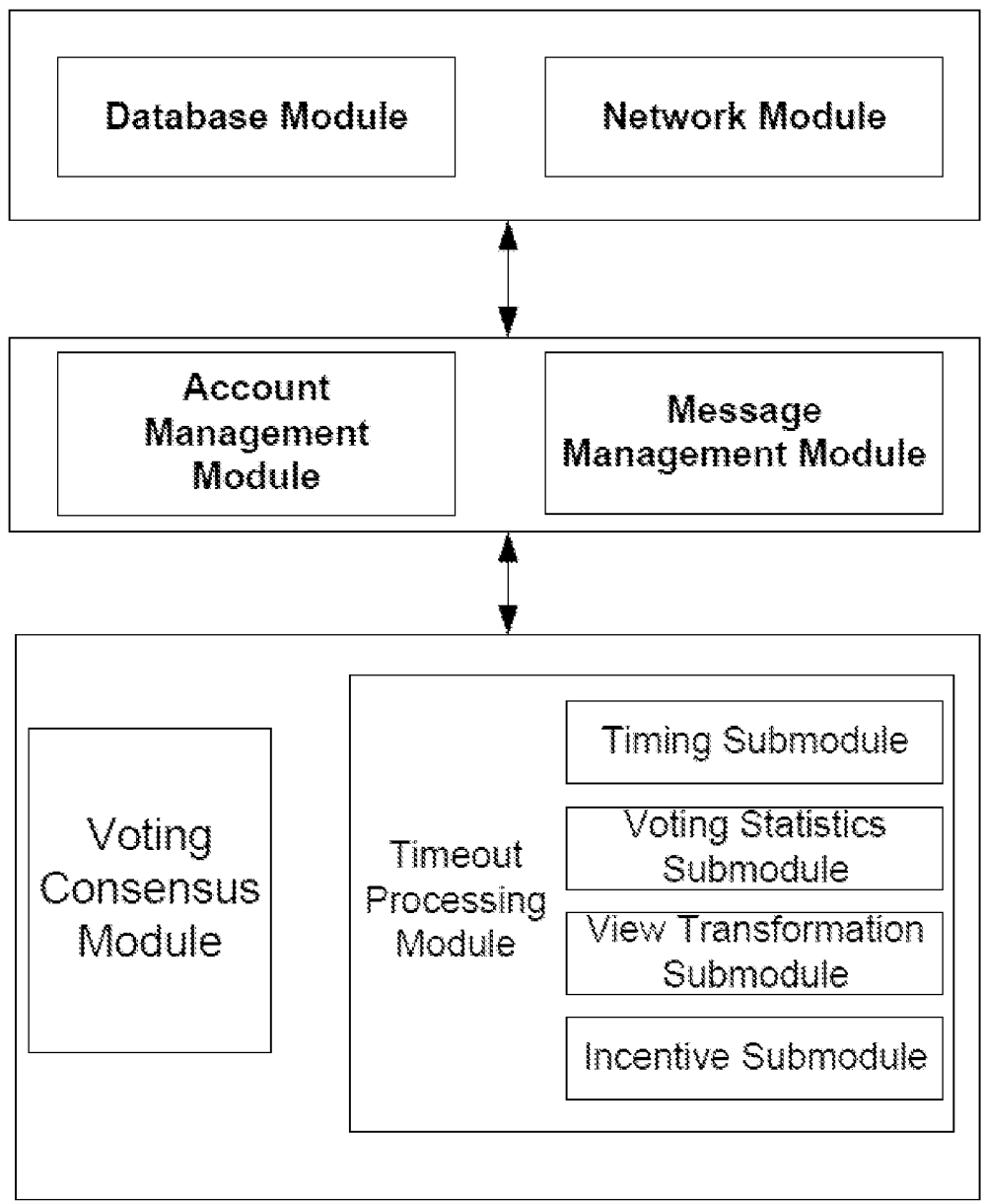
FIG. 6 depicts a schematic diagram showing a timeout processing module of a blockchain node according to an embodiment of the present disclosure.

FIG. 6 depicts a schematic diagram showing a timeout processing module of a blockchain node according to an embodiment of the present disclosure. The module includes a timing submodule, a voting statistics submodule, a view transformation submodule, and an incentive submodule.

The timing sub-module is configured to provide the starting time to and ending time t of the current round of consensus, and duration of a round of consensus $T_{cut}$.

The voting statistics sub-module includes the voting operation of voting nodes and the statistical operation of duty bookkeeping nodes. In particular, each voting nodes perform the voting operation after receiving the timeout message and send the vote to the duty bookkeeping node of the subsequent epoch. If the block has been received, the block will be voted in a routine way. Alternatively, if the block has not been received, the result of the vote is set to 0 (no opinion), and the hash value of the block is set to null. After receiving more than $2N_v/3$ of the votes from voting nodes, the duty bookkeeping node counts the vote of each block in the block group and generates statistical results. In such a case, the statistical rule is: if any numbered block obtains approval votes of more than $N_v/3$ for any hash value, it is regarded that the generation of the block is approved, and the voting result of the block is set to 1, otherwise it is regarded the generation of the block is objected to, and the voting result of the block is set to −1. $N_v$ is the number of voting nodes.

The view transformation sub-module relates to the data synchronization operation of nodes and block group header verification operation. As core consensus nodes of the network, the voting nodes are considered to have the latest blockchain state. Each node needs to request the blockchain height thereof from each voting node and maintain the online status of each voting node locally. If a voting node has a height of the blockchain higher than the local height of the blockchain, a block group with a height high than the local height is requested from the voting node for data synchronization. When receiving a new block group header, the node performs a verification on the voting list contained in the block group header received after the timeout. Only the block group header containing votes of more than $2N_v/3$ can pass the verification, and the block with more than approval votes of more than $N_v/3$ is considered to be voted consent otherwise the block is regarded as being voted objection.

The incentive sub-module realizes the scoring mechanism and reward mechanism. Each voting node will maintain a list of bookkeeping nodes and score the bookkeeping nodes. The score from each bookkeeping node represents the trust degree for the concerned bookkeeping node and becomes one of the basis for the voting node for the voting nodes. After the duty of each round ends, the bookkeeping node receives rewards from the consortium according to the number of generated legal blocks and block group heads.

Figure 7:
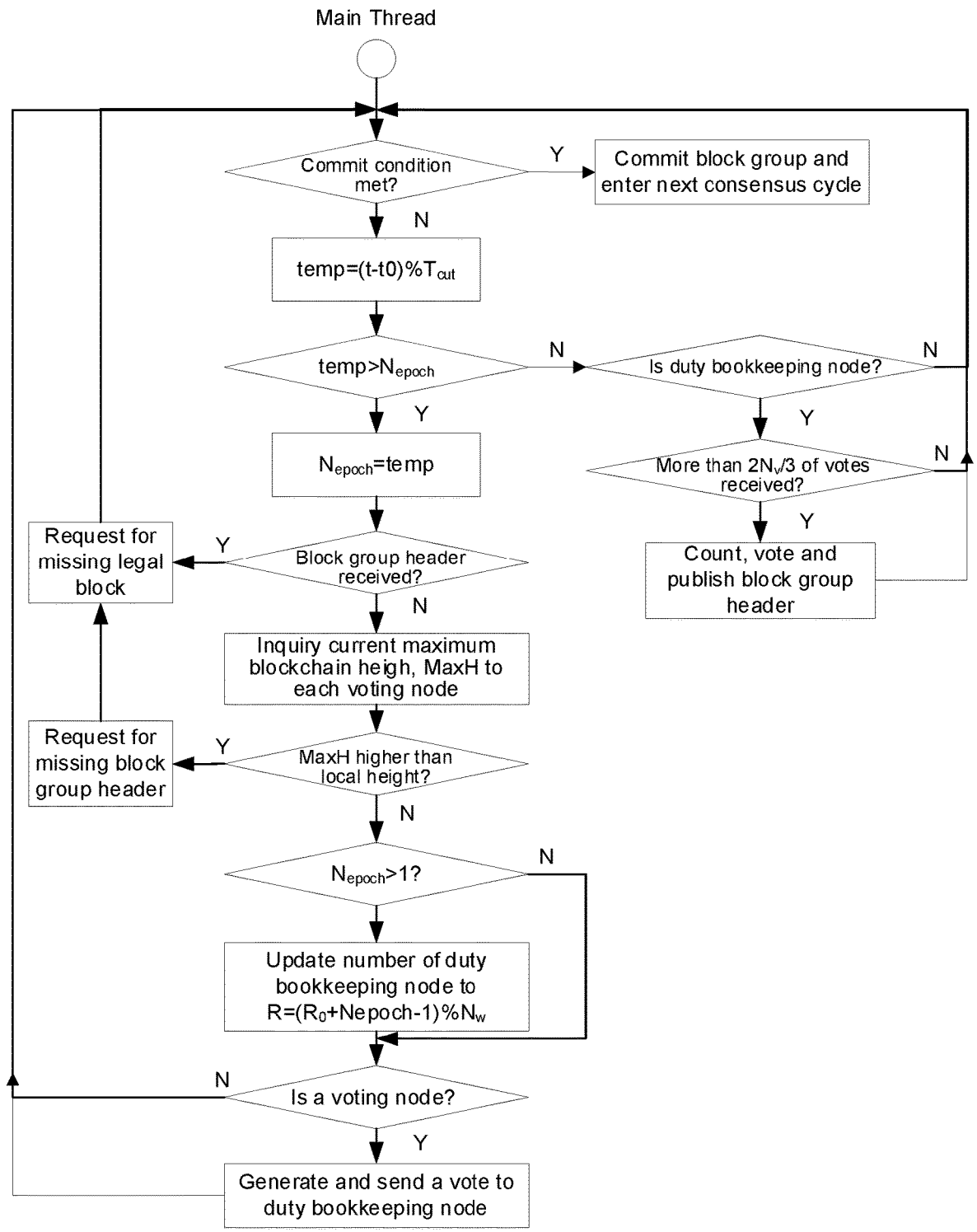
FIG. 7 depicts a flowchart showing the timeout processing of a blockchain node according to an embodiment of the present disclosure.

In order to illustrate the processing of the PPoV consensus algorithm after the timeout, that is, how to obtain the missing block group headers and blocks, the following description will be provided with reference to FIG. 7, which depicts a flowchart showing the timeout processing of nodes in a blockchain according to an embodiment of the present disclosure. Taking the timeout processing of bookkeeping nodes as an example, for general non-incentive scenarios, the timeout processing can be classified into two situations.

One case is that the bookkeeping node has received the legal block group header, but fails to have enough legal blocks. In this case, the generated block group header indicates that the consensus has been completed. And insufficient received legal blocks may be resulted from network failure and other reasons, so it is only necessary to request the missing legal blocks from other nodes.

In the other case, the bookkeeping node fails to receive the legal block group header, which may be resulted from some failure in the duty bookkeeping node, or failures in other bookkeeping nodes, so the generated blocks are not enough. In this case, the following operations are performed.

At operation 1, the bookkeeping node requests the blockchain height thereof from all voting nodes and locally maintains the online status of each voting node. If a voting node has a height of the blockchain higher than the local height of the blockchain, a block group with a height high than the local height is requested from the voting node for data synchronization. Then the timeout processing ends. Otherwise, the processing proceeds with the following timeout operations.

At operation 2, each voting node immediately performs a voting operation, and if the block has been received, the block will be voted in a routine way, or if the block has not been received, the result of the vote is set to 0 (no opinion), and the hash value of the block is set to null. The generated votes are sent to the duty bookkeeping node of the subsequent epoch.

At operation 3, after receiving more than $2N_v/3$ of the votes, the duty bookkeeping node counts the vote of each block in the block group and generates statistical results. In such a case, the statistical rule is: if any numbered block obtains approval votes of more than $N_v/3$ for any hash value, it is regarded that the generation of the block is approved, and the voting result of the block is set to 1, otherwise it is regarded the generation of the block is objected to, and the voting result of the block is set to −1. $N_v$ is the number of voting nodes.

At operation 4, if $N_{epoch}>1$, that is the timeout occurs for more than two times, it is necessary to change the duty bookkeeping node. If the number of the bookkeeping node before the overtime is $R_0$, the number R of the current duty bookkeeping node is $(R_0+N_{epoch}-1)\% N_w$. $N_w$ is the number of bookkeeping nodes.

At operation 5, each node performs a verification on the voting list contained in the block group header received after the timeout. Only the block group header containing votes of more than $2N_v/3$ can pass the verification, and the block with more than approval votes of more than $N_v/3$ is considered to be voted consent, otherwise the block is regarded as being voted objection.

For general incentive scenarios, in addition to the above, the trigger of timeout is accompanied by the decrease in the reward for the bookkeeping node. Details are as follows.

Proof of Vote consensus designs scoring mechanism and reward mechanism. In the incentive scenario, the main purpose of bookkeeping nodes participating in the election and generation of legal blocks is to obtain bookkeeping fees. The consortium chain system can solve the problem of bookkeeping fees by introducing tokens, and the amount unit and conversion of tokens correspond to the actual monetary amount unit and conversion one by one. After the establishment of the consortium, a consortium fund account address will be set up, corresponding to a real account in which funds are deposited in the bank.

A bookkeeping node with a higher score, has a higher likelihood to acquire more votes to be elected as the leader node. The leader node that successfully encapsulates the legal block group will get the corresponding amount of reward according to the number of the legal block group, thus attracting more users to join and elect to be the bookkeeping nodes. The reward for honest work and the punishment for malicious behavior direct the system to develop in an increasingly safe and reliable direction.

Each voting node maintains a list of bookkeeping nodes and scores the bookkeeping nodes. The scoring rules are as follows.

Rule 1, every time the verification of a block is passed by a voting node, the voting node gives some scores to the corresponding bookkeeping node, and if the verification is not passed, the voting node deducts the scores or even clears the scores of the bookkeeping node.

Rule 2, every time the verification of a block group header is passed, the voting node gives some scores to the corresponding leader node, and if the verification is not passed, the voting node deducts the scores or even clears the scores of the leader node.

Rule 3, When the bookkeeping node is offline and fails to generate the blocks, a timeout is triggered. The score of the bookkeeping node will be reduced or even cleared by all voting nodes. If the offline behavior is severely punished in the consortium agreement and is uniformly to clear the score, the bookkeeping node has to earn the score from 0 when being online again.

The score of the bookkeeping node at each voting node may be different. The score of each bookkeeping node represents the degree of trust for the concerned bookkeeping node and becomes one of the basis for the respective voting node. After the duty of each round ends, a bookkeeping node receives rewards from the consortium according to the number of generated legal blocks and block group headers, such that the bookkeeping node is motivated to engage in the election, work honestly and keep online.

In order to illustrate the procedure of timeout processing, the following two embodiments are described.

Embodiment 1: In a transfer scenario without reward based on parallel proof of vote consensus, suppose that user A requests to transfer a sum of money from his account to user B's account. If user A fails to receive the block group containing information indicating whether the transfer is successful or not before the moment $T_{cut}$, a timeout will be triggered. The flow of processing is as follows.

At S1, user A first requests the latest blockchain height from all voting nodes, and if the blockchain height of a voting node is higher than the local blockchain height, user A requests a block group higher than the local height from the node and ends the timeout processing. Otherwise, user A sends a timeout request to all voting nodes and the duty bookkeeping node.

At S2, the voting nodes, after receiving the timeout request, perform voting operations immediately, for a received block, the block will be voted in a routine way; for an unreceived block, the result of the vote is set to 0 (no opinion), and the hash value of the block is set to null. After receiving votes of more than $2N_v/3$, the duty bookkeeping node counts each block in the block group and generates statistical results.

At S3, the user, after receiving the new block group header, verifies the number of approval votes by the transfer transaction from user A to user B, and if the approval votes exceed $N_v/3$, the transfer operation is carried out; otherwise, the transfer operation is denied.

Embodiment 2: In an identifier registration scenario without reward based on parallel proof of vote consensus, suppose that user X requests to register a new identifier in the network. If user X fails to receive the block group containing information indicating whether the registration is successful or not before the moment $T_{cut}$, a timeout will be triggered. The flow of processing is as follows.

At S1, user X first requests the latest blockchain height from all voting nodes, and if the blockchain height of a voting node is higher than the local blockchain height, user A requests a blockchain group higher than the local height from the node and ends the timeout processing. Otherwise, user X sends a timeout request to all voting nodes and the duty bookkeeping node.

At S2, the voting nodes, after receiving the timeout request, perform voting operations immediately, for a received block, the block will be voted in a routine way; for an unreceived block, the result of the vote is set to 0 (no opinion), and the hash value of the block is set to null. After receiving votes of more than $2N_v/3$, the duty bookkeeping node counts each block in the block group and generates statistical results.

At S3, the user, after receiving the new block group header, verifies the approval votes obtained by user X's identifier registration transaction, and if the approval votes exceed $N_v/3$, adds the new identifier information to the database.

In the case of the above-described scenarios with and without reward, the processing rule ensures that a legal block group can be generated in a round of consensus, in view of the fact that the above-described bookkeeping node fails to meet the preset conditions. That is, the bookkeeping node receives a legal block group header and enough blocks. However, when the traditional PPoV consensus algorithm generates the block group header, it is not possible for the voting node to vote since the bookkeeping node does not generate enough blocks, so that the leader node fails to receive the voting result and cannot generate the block group header. The method for acquiring a block group header during the timeout processing mentioned above is a supplement and improvement to the traditional PPoV consensus process, which increases the robustness of the blockchain and enables the blockchain network to operate properly and generate blocks even in the event of abnormal situations.

From the description of the above embodiments, it is apparent to a person having ordinary skills in the art that the method of the above embodiments can be implemented by means of software with necessary general hardware platform, or by hardware, of course, but in many cases, the former is the better practice. Based on this understanding, the technical solution of the present disclosure can be embodied in the form of software products, which are stored in a storage medium (such as ROM/RAM, magnetic disk and optical disk) and include several instructions to cause a terminal device (which can be a mobile phone, a computer, a server or a network device, etc.) execute the methods described in various embodiments of the present disclosure.

In this embodiment, there is further provided a device for acquiring the block group header, which is configured to carry out the above embodiment and other embodiments, and the description provided above is not repeated here. As used below, the term "module" may be a combination of software and/or hardware that carries out a predetermined function. Although the device described in the following embodiment is preferably implemented as software, implementation as hardware, or as a combination of software and hardware, is also possible and conceivable.

Figure 8:
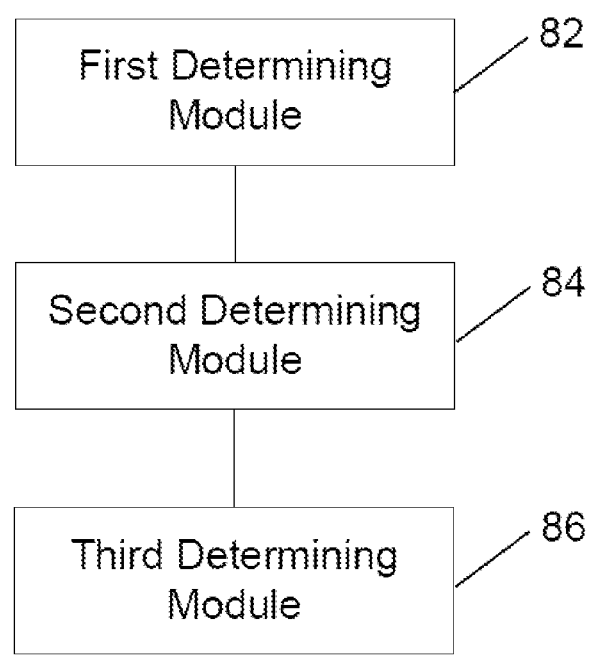
FIG. 8 depicts a schematic block diagram showing a device for acquiring a block group header according to an embodiment of the present disclosure.

FIG. 8 depicts a schematic block diagram of a device for acquiring a block group header according to an embodiment of the present disclosure. The device includes the following.

A first determining module 82, which is configured to perform a determination as to whether a target node in a blockchain system meets a preset condition, where the preset condition is indicative of at least one of, the target node receiving a block group header but failing to receive a preset number of legal blocks, or the target node failing to receive the block group header.

A second determining module 84, which is configured to identify a cause of the event that the target node fails to receive the block group header, in response to the determination that the target node has not received the block group header, where the cause of the event includes at least one of, the target node failing to receive the block group header, or the blockchain system failing to generate the block group header.

A third determining module 86, which is configured to determine a method for acquiring the unreceived block group header according to the cause of the event.

According to the present disclosure, it is determined whether the target node of the blockchain system meets the preset conditions. There are two preset conditions, one is that the target node receives the block group header but fails to receive a preset number of legal blocks, and the other one is that the target node fails to receive the block group header. According to these two situations, two different strategies are provided respectively. In the case of a failure in receiving the block group header, the cause of the event of the failure in receiving the block group header is identified, and then the method for acquiring the block group header that the target node fails to receive is determined according to the cause of the event. By means of the technical scheme described above, the problems of low acquisition rate of PPoV consensus algorithm during the acquisition of block group headers are solved, and then different methods are adopted according to different causes of the event for acquiring block group headers, thus improving the acquisition rate of block group headers.

It can be understood that, in the first determining module 82, the condition for terminating the PPoV consensus algorithm lies in: condition 1, the target node receives the block group header but fails to receive the preset number of legal blocks; and condition 2, the target node fails to receive the block group header. The target node in the blockchain system should determine whether the preset conditions are met. If the preset conditions are not met, a timeout will be triggered, such that the target node will perform related operation for the timeout. When the target node fails to receive the block group header, the cause of the event is determined. In particular, the cause of the event includes at least one of, the target node failing to successfully receive the block group header, or the blockchain system failing to generate the block group header. Then the blockchain system determines the method for acquiring the block group header that the target node fails to receive according to the cause of the event. For example, bookkeeping node A in the blockchain system fails to receive a block group header, so bookkeeping node A triggers a timeout, requests its blockchain height from all voting nodes, and maintains the online status of each voting node locally. If the blockchain height of a voting node is higher than the local blockchain height of bookkeeping node A, it indicates that the bookkeeping node A fails to successfully receive the block group header. If the higher blockchain height is not found, it indicates that the blockchain system does not generate the block group header. Then the bookkeeping node A determines the method for acquiring according to the cause of the event.

At the same time, the third determining module 86 is further configured to, perform synchronization with a voting node of the blockchain system, and acquire unreceived the block group header from the voting node through the synchronization, under the condition that the cause of the event indicates that the target node fails to successfully receive the block group header. In this implementation, if the target node does not receive the block group header, the target node requests a voting node for the block group header. As a core consensus node of the blockchain network, the voting node is considered to have the latest blockchain state. Once the system generates a block group header, the voting node will definitely receive the header during the broadcasting of the header to the blockchain network. For example, if the bookkeeping node A does not receive the block group header, the bookkeeping node A carries out a synchronization with the voting node B for data synchronization and acquires the block group header, where the blockchain height of the voting node B is higher than that of the bookkeeping node A.

In some examples, during the synchronization and acquisition of the unsuccessfully received block group header from the voting node of the blockchain system, it is necessary to acquire the block group from the voting node with a higher blockchain height than the local height of the bookkeeping node. The blockchain height is indicative of the block height. In this embodiment, the blockchain height can be understood as a database. Since the blockchain system is a distributed system without a unified database, it can be understood that each blockchain node has a database. The blockchain height of the voting node is higher than the local height of the bookkeeping node, which indicates that the database of the voting node is newer than that of the bookkeeping node. Therefore, in order to obtain the block group header, it is necessary for an older database to synchronize data with a newer database.

A third confirmation module 86 is further configured to: instruct the voting nodes to vote for the block that has been received when the cause of the event indicates that the block group header has not been generated by the blockchain system, and set the processing result of the unreceived legal block as the target value, so as to instruct the voting nodes to have no opinion on the unreceived legal block and generate the voting result, and send the voting result to the duty bookkeeping node to instruct the duty bookkeeping node to generate the legal block group header that has not been received previously. In this implementation, it can be understood that when the bookkeeping node requests its blockchain height from all the voting nodes, once no voting node is found to have a higher blockchain height than the local blockchain height of the bookkeeping node, it indicates that the blockchain system has not generated a block group header. In such a case, all the voting nodes are instructed to vote on the blocks received from the bookkeeping node. The processing result of the unreceived legal blocks is set as the target value, so as to indicate that the voting nodes have no opinion on the unreceived block. Then each voting node send the respective voting result to the duty bookkeeping node for statistics. As such the duty bookkeeping node generates a block group header. For example, there exists bookkeeping node A, bookkeeping node B, bookkeeping node C, voting node X, voting node Y, voting node Z and duty bookkeeping node M. When bookkeeping node A fails to acquire with synchronization, the required block group header from voting node X, voting node Y and voting node Z, voting node X, voting node Y and voting node Z will routinely vote on the blocks that have been received from bookkeeping node A. Assuming that block A from bookkeeping node a and block b from bookkeeping node B have been received, voting node X, voting node Y and voting node Z will routinely vote on blocks a and b, and at the same time, the voting result for the unreceived block c that is supposed to be generated by bookkeeping node C shall be set to 0 (no opinion). Finally, the voting node X, the voting node Y and the voting node Z respectively generate a voting information table to the duty bookkeeping node M. The duty bookkeeping node M collects the tables and carries out statistics, thus generating the block group header.

During the generation of the unreceived legal block group header by the duty bookkeeping node, the duty bookkeeping node can only count the vote of each block in the block group and generate a statistical result when receiving the voting information from more than $2N_v/3$ of the voting nodes. If it is counted that more than $1N_v/3$ voting nodes agree with any one legal block, the duty bookkeeping node agrees to generate the legal block and sets its voting result as 1, otherwise, the duty bookkeeping node does not agree to generate the legal block and sets its voting result as −1. $N_v$ is the number of voting nodes in the blockchain system. For example, the exists voting node X, voting node Y, voting node Z, and voting node W. The duty bookkeeping node M can generate statistical results only when receiving the voting information of at least three of the four voting nodes, and any block is allowed to be generated only if at least two of the four voting nodes vote to consent.

After generating a legal block group header, the duty bookkeeping node broadcasts the generated block group header to each node of the blockchain system, so as to instruct all the nodes to verify the generated block group header. During the verification, only the block group header that includes more than $2N_v/3$ of the votes can pass the verification, and if the verification passes, the successfully generated block group header is received.

It can be understood that, if the target node successfully receives the target group header, but fails to receive a preset number of legal blocks, the target node sends an acquisition request to other nodes in the blockchain system, to acquire the legal blocks from the other nodes which are nodes other than the target node in the blockchain system and save the legal blocks. For example, bookkeeping node A successfully receives the block group header after the PPoV consensus ended, but fails to receive enough blocks due to network failure, such as block b and block c. In such a case, bookkeeping node A broadcasts a request to other nodes in the blockchain network for acquiring the blocks b and c that were not received.

An embodiment of the present disclosure further provides a computer-readable storage medium storing a computer program, which when executed by a processor, causes the processor to carry out any one of the methods described in the above embodiments.

In some examples of this embodiment, the above storage medium is configured to store a computer program for performing the following operations.

At S1, a determination is performed as to whether a target node in a blockchain system meets a preset condition, where the preset condition is indicative of at least one of, the target node receives a block group header but fails to receive a preset number of legal blocks, or the target node fails to receive the block group header.

At S2, a cause of the event that the target node fails to receive the block group header is identified, in response to the determination that the target node has not received the block group header, where the event reason includes at least one of, the target node fails to successfully receive the block group header, or the blockchain system fails to generate the block group header.

At S3, a method for acquiring the block group header that the target node fails to receive, is determined according to the cause of the event.

In an embodiment, the computer-readable storage medium may include, but is not limited to, U disk, Read-Only Memory (ROM), Random Access Memory (RAM), portable hard disk, magnetic disk or optical disk, or other media that can store computer programs.

The specific examples in this embodiment, can be referred to the examples described in the above embodiments, and which will not be repeated here.

An embodiment of the present disclosure further provides an electronic apparatus, which includes a processor and a memory storing a computer program, which when executed by a processor, causes the processor to carry out the method in any of the above embodiments.

In some implementations of this embodiment, the above processor is configured to perform the following operations with computer programs.

At S1, a determination is performed as to whether a target node in a blockchain system meets a preset condition, where the preset condition is indicative of at least one of, the target node receiving a block group header but failing to receive a preset number of legal blocks, or the target node failing to receive the block group header.

At S2, a cause of the event that the target node fails to receive the block group header is identified, in response to the determination that the target node has not received the block group header, where the event reason includes at least one of, the target node failing to receive the block group header, or the blockchain system failing to generate the block group header.

At S3, a method for acquiring by the target node, the block group header that fails to be received, is determined according to the cause of the event.

In an embodiment, the above electronic apparatus may further include a transmission device and an input-output device, in which the transmission device is connected with the above processor, and the input-output device is connected with the above processor.

The specific examples in this embodiment, can be referred to the examples described in the above embodiments or other implementations, and which will not be repeated here.

It shall be apparent to those having ordinary skill in the art that the above modules or processes of the present disclosure can be implemented as a general-purpose computing device, which may be distributed in an integrated manner over a single computing device or distributed over a network composed of a plurality of computing devices, and which may be implemented as program codes executable by the computing device(s), thus which can be stored in a storage device and executed by the computing device(s). And in some cases, the processes shown or described may be performed in an order different than those shown or described. Alternatively, all or some of the processes may be embodied separately into individual integrated circuit modules. As such, the present disclosure is not limited to any particular combination of hardware and software.

While some embodiments of the present disclosure are described above, the present disclosure is not limited by those embodiments described. Various modifications and alternations can be made by those having ordinary skills in the art. Any modifications, equivalents, alternations, or improvements, made within the concepts of the present disclosure shall be included in the scope of protection of present disclosure.

What is claimed is:

1. A method for acquiring a block group header, comprising,
performing a determination as to whether a target node in a blockchain system meets a preset condition, wherein the preset condition is indicative of at least one of,
the target node receiving a block group header but failing to receive a preset number of legal blocks, or
the target node failing to receive the block group header;
identifying a cause of an event that the target node fails to receive the block group header, in response to the determination that the target node fails to receive the block group header, wherein the cause of the event comprises at least one of,
the target node failing to receive the block group header, or
the blockchain system failing to generate the block group header; and
determining a method for acquiring by the target node, the block group header that fails to be received, according to the cause of the event.

2. The method according to claim 1, wherein determining the method for acquiring by the target node, the block group header that fails to be received, according to the cause of the event, comprises,
performing synchronization with a voting node in the blockchain system, and
acquiring the block group header that fails to be received from the voting node by the synchronization, in response to the cause of the event indicating that the target node fails to receive the block group header.

3. The method according to claim 2, wherein, performing the synchronization with the voting node in the blockchain system, and acquiring the block group header that fails to be received from the voting node by the synchronization, comprises,
identifying a voting node with a blockchain height higher than the blockchain height of the target node, from the blockchain system, and the blockchain height is indicative of a block height; and
acquiring the block group header from the voting node with the blockchain height higher than the blockchain height of the target node, by the synchronization.

4. The method according to claim 1, wherein determining the method for acquiring by the target node, the block group header that fails to be received, according to the cause of the event, comprises,
instructing a voting node to vote for a block that has been received in response to the cause of the event indicating that the blockchain system fails to generate the block group header, and setting a processing result of an unreceived legal block as a target value, so as to instruct the voting node to have no opinion on the unreceived legal block and generate a voting result of the voting node, and
sending the voting result to a duty bookkeeping node to instruct the duty bookkeeping node to generate the legal block group header that fails to be generated previously.

5. The method according to claim 4, wherein, sending the voting result to a duty bookkeeping node to instruct the duty bookkeeping node to generate the legal block group header that fails to be generated previously, comprises,
for a legal block corresponding to the legal block group header that fails to be generated previously, determining that the duty bookkeeping node agrees to generate the legal block, in response to a count by the duty bookkeeping node indicating that votes of consent for the legal block exceed $1N_v/3$, wherein,
$N_v$ is a quantity of voting nodes in the blockchain system.

6. The method according to claim 1, wherein, subsequent to determining the method for acquiring by the target node, the block group header that fails to be received, according to the cause of the event, the method further comprises,
in response to a generation of the block group header that fails to be received previously, instructing a duty bookkeeping node to broadcast the block group header that has been generated to each node in the blockchain system, so as to instruct each node to:
perform verification on the block group header as acquired, and
receive the block group header that has been generated in response to a pass of the verification.

7. The method according to claim 1, wherein, subsequent to performing the determination as to whether the target node in the blockchain system meets the preset condition, the method further comprises,
in response to a reception of the block group header by the target node and a failure in a reception of the preset number of legal blocks,
sending an acquisition request to a further node in the blockchain system, for acquiring a legal block from the further node which is another node except the target node in the blockchain system, and the further node stores the legal block.

8. A non-transitory computer-readable medium storing a computer program thereon which, when executed by a processor, causes the processor to carry out a method for acquiring a block group header, comprising,
performing a determination as to whether a target node in a blockchain system meets a preset condition, wherein the preset condition is indicative of at least one of,
the target node receiving a block group header but failing to receive a preset number of legal blocks, or
the target node failing to receive the block group header;
identifying a cause of an event that the target node fails to receive the block group header, in response to the determination that the target node fails to receive the block group header, wherein the cause of the event comprises at least one of,
the target node failing to receive the block group header, or
the blockchain system failing to generate the block group header; and determining a method for acquiring by the target node, the block group header that fails to be received, according to the cause of the event.

9. An electronic apparatus comprising a processor and a memory storing a computer program which, when executed by a processor, causes the processor to carry out a method for acquiring a block group header, comprising,
performing a determination as to whether a target node in a blockchain system meets a preset condition, wherein the preset condition is indicative of at least one of,
the target node receiving a block group header but failing to receive a preset number of legal blocks, or
the target node failing to receive the block group header;
identifying a cause of an event that the target node fails to receive the block group header, in response to the determination that the target node fails to receive the block group header, wherein the cause of the event comprises at least one of,
the target node failing to receive the block group header, or
the blockchain system failing to generate the block group header; and
determining a method for acquiring by the target node, the block group header that fails to be received, according to the cause of the event.

10. The non-transitory computer-readable medium of claim 8, wherein determining the method for acquiring by the target node, the block group header that fails to be received, according to the cause of the event, comprises,
performing synchronization with a voting node in the blockchain system, and
acquiring the block group header that fails to be received from the voting node by the synchronization, in response to the cause of the event indicating that the target node fails to receive the block group header.

11. The non-transitory computer-readable medium according to claim 10, wherein, performing the synchronization with the voting node in the blockchain system, and acquiring the block group header that fails to be received from the voting node by the synchronization, comprises,
identifying a voting node with a blockchain height higher than the blockchain height of the target node, from the blockchain system, and the blockchain height is indicative of a block height; and
acquiring the block group header from the voting node with the blockchain height higher than the blockchain height of the target node, by the synchronization.

12. The non-transitory computer-readable medium according to claim 8, wherein determining the method for acquiring by the target node, the block group header that fails to be received, according to the cause of the event, comprises,
instructing a voting node to vote for a block that has been received in response to the cause of the event indicating that the blockchain system fails to generate the block group header, and
setting a processing result of an unreceived legal block as a target value, so as to instruct the voting node to have no opinion on the unreceived legal block and generate a voting result of the voting node, and
sending the voting result to a duty bookkeeping node to instruct the duty bookkeeping node to generate the legal block group header that fails to be generated previously.

13. The non-transitory computer-readable medium according to claim 12, wherein, sending the voting result to a duty bookkeeping node to instruct the duty bookkeeping node to generate the legal block group header that fails to be generated previously, comprises,
for a legal block corresponding to the legal block group header that fails to be generated previously, determining that the duty bookkeeping node agrees to generate the legal block, in response to a count by the duty bookkeeping node indicating that votes of consent for the legal block exceed $1N_v/3$, wherein,
$N_v$ is a quantity of voting nodes in the blockchain system.

14. The non-transitory computer-readable medium according to claim 8, wherein, subsequent to determining the method for acquiring by the target node, the block group header that fails to be received, according to the cause of the event, the method further comprises,
in response to a generation of the block group header that fails to be received previously, instructing a duty bookkeeping node to broadcast the block group header that has been generated to each node in the blockchain system, so as to instruct each node to:
perform verification on the block group header as acquired, and
receive the block group header that has been generated in response to a pass of the verification.

15. The electronic apparatus of claim 9, wherein determining the method for acquiring by the target node, the block group header that fails to be received, according to the cause of the event, comprises,
performing synchronization with a voting node in the blockchain system, and
acquiring the block group header that fails to be received from the voting node by the synchronization, in response to the cause of the event indicating that the target node fails to receive the block group header.

16. The electronic apparatus according to claim 15, wherein, performing the synchronization with the voting node in the blockchain system, and acquiring the block group header that fails to be received from the voting node by the synchronization, comprises,
identifying a voting node with a blockchain height higher than the blockchain height of the target node, from the blockchain system, and the blockchain height is indicative of a block height; and
acquiring the block group header from the voting node with the blockchain height higher than the blockchain height of the target node, by the synchronization.

17. The electronic apparatus according to claim 9, wherein determining the method for acquiring by the target node, the block group header that fails to be received, according to the cause of the event, comprises,
instructing a voting node to vote for a block that has been received in response to the cause of the event indicating that the blockchain system fails to generate the block group header, and
setting a processing result of an unreceived legal block as a target value, so as to instruct the voting node to have no opinion on the unreceived legal block and generate a voting result of the voting node, and
sending the voting result to a duty bookkeeping node to instruct the duty bookkeeping node to generate the legal block group header that fails to be generated previously.

18. The electronic apparatus according to claim 17, wherein, sending the voting result to a duty bookkeeping node to instruct the duty bookkeeping node to generate the legal block group header that fails to be generated previously, comprises, for a legal block corresponding to the legal block group header that fails to be generated previously, determining that the duty bookkeeping node agrees to generate the legal block, in response to a count by the duty bookkeeping node indicating that votes of consent for the legal block exceed $1N_v/3$, wherein, $N_v$ is a quantity of voting nodes in the blockchain system.

19. The electronic apparatus according to claim 9, wherein, subsequent to determining the method for acquiring by the target node, the block group header that fails to be received, according to the cause of the event, the method further comprises, in response to a generation of the block group header that fails to be received previously, instructing a duty bookkeeping node to broadcast the block group header that has been generated to each node in the blockchain system, so as to instruct each node to:

perform verification on the block group header as acquired, and receive the block group header that has been generated in response to a pass of the verification.

20. The electronic apparatus according to claim 9, wherein, subsequent to performing the determination as to whether the target node in the blockchain system meets the preset condition, the method further comprises, in response to a reception of the block group header by the target node and a failure in a reception of the preset number of legal blocks, sending an acquisition request to a further node in the blockchain system, for acquiring a legal block from the further node which is another node except the target node in the blockchain system, and the further node stores the legal block.

* * * * *